United States Patent Office 3,445,236
Patented May 20, 1969

3,445,236
PRESSURE CONVERSION OF GREEN TEA
Martin Gurkin, Bardonia, N.Y., assignor to Thomas J. Lipton, Inc., Englewood Cliffs, N.J., a corporation of Delaware
No Drawing. Filed Jan. 7, 1966, Ser. No. 519,196
Int. Cl. A23f 3/00
U.S. Cl. 99—76                 12 Claims

ABSTRACT OF THE DISCLOSURE

A process of converting constituents of green tea to a black tea which comprises heating said constituents in the presence of water and a gas containing at least about 5% oxygen at a temperature above about 50° C. and under a black tea which comprises heating said constituents in the constituents to react with said oxygen for at least about 7.5 minutes to convert said constituents, the weight of said constituents being at least about 2% of the weight of the water.

---

This invention relates to tea and tea extracts and to processes for preparing the same. More particularly, the invention relates to a novel process of converting tea and extracts of tea, such as green tea, to oxidation products thereof, such as black tea.

Green tea, as the term is employed herein, includes freshly gathered tea leaves, tea leaves which have been freshly gathered and dried immediately, tea leaves which have been heat-treated before drying to inactivate the enzymes therein, and aqueous extracts of these leaves. In each instance, the green tea has undergone substantially no fermentation to the "black" state.

Black tea, on the other hand, is usually prepared by subjecting freshly picked tea leaves to a series of processing conditions including the withering and rolling of freshly harvested leaves, followed by a fermentation step (enzymic oxidation) during which the characteristic color, flavor and aroma of black tea are developed. The fermentation is stopped after a suitable period of time, the tea leaves are "fired" to inactivate the enzymes causing the fermentation and the tea is dried. The extent of fermentation varies, in commercial practice, from black to various gradations between green and black. Partially fermented teas are known as "oolong" teas. The green, oolong, and black teas each have distinctive flavor and color characteristics.

The fermentation processes are generally carried out at or near the tea growing areas and the fermentation conditions vary with local custom and climatic conditions. As a result, the fermented teas of commerce vary greatly in color and quality of flavor, depending upon the area of the world in which they are produced and the conditions of processing. A means for standardizing or at least insuring the production of a uniform quality of fermented black tea and of partially fermented varieties from a given green tea has long been sought.

It has been proposed to convert green tea to black tea by artificial means and methods, for example, by treating an extract of the green leaf with a catalyst such as potassium permanganate at a temperature as high as about 90° C. for a period of time ranging as long as about six hours, as disclosed in United States Patent 2,863,775. As far as we are aware, however, such method has never attained commercial significance.

Another method proposed for converting green tea extracts to black tea involves the use of fresh green tea leaves still containing their natural enzymes by adding such fresh leaves to an aqueous extract of green leaf thereby to convert the latter to black tea. Such procedures are disclosed and claimed in the Seltzer et al. Patent 2,975,057.

It is an object of the present invention to provide a process whereby black and partially converted teas can be prepared from fresh or manufactured green tea under closely controlled conditions.

Another object of the invention is to produce teas of varying degrees of color and flavor from green tea and/or green tea extracts.

Another object of the invention is to convert green teas at temperatures higher than those at which normal fermentations can occur.

Still another object of the invention is to effect the conversion of green teas in shorter periods of time and under conditions which produce uniform quality in the final product, even when teas from a variety of sources are used.

Another object of the invention is to produce black tea from green teas which would not normally be suitable for use in standard black fermentation because of low enzyme activity or the lack of certain constituents required for standard fermentation.

Another object of the invention is to obtain a process for converting green teas which does not require the use of a chemical additive, for example, potassium permanganate to effect the conversion.

It is another object of the invention to bring about the conversion of green tea without the use of enzymes which become inactivated by heating.

Still another object of the invention is to develop a process of converting green tea products which readily lends itself to continuous operations.

Another object of the invention is to produce an instant black tea directly from green tea without the necessity of carrying out the additional processing steps (such as firing and drying) required for the manufacture of commercial black tea.

Another object is to convert tea by a process in which aroma constituents are conserved.

In accordance with the present invention, by which the foregoing objects are realized, the water-soluble constituents of green tea, which may be an aqueous extract of green tea or the green tea leaf itself prior to extraction and containing such constituents, are heated in the presence of water and oxygen at a temperature above about 50° C. and under a pressure of at least 100 p.s.i. gauge. Under the conditions prevailing, the reaction between the oxygen and the water-soluble constituents of the green tea is allowed to progress until a desired amount of conversion of green tea to black tea has taken place.

Although the conditions of pressure and temperature are important in obtaining the objectives of the invention, other conditions are also to be considered, such as the concentration of oxygen in the gas used for conversion, the time and pH of reaction, agitation of the reaction system, and the concentration of the tea solids in the aqueous system. These and other features of the invention will be discussed in the following description.

The following examples illustrate how the invention may be carried out. The percentages expressed are on a weight basis unless otherwise indicated.

EXAMPLE 1

A green tea extract (prepared from Japan green siftings) containing about 5% soluble tea solids was treated with air under pressure by placing the extract at 100° C. in a pressure vessel fitted with a high speed agitator and pressurizing the vessel with air to 800 p.s.i. gauge. Agitation was maintained at 100° C. at this pressure for 12 minutes. The pressure was then released and the converted green tea solution cooled to 10° C. During this treatment, the pH of the green tea solution decreased from 5.5 to 4.0. The pH was, therefore, adjusted to 5.5 after pressure treatment by the addition of 4.0% potassium hydroxide (based on the weight of soluble tea solids initially present) as a 45% solution; 2.4% CaCl$_2$. 2H$_2$O was then added and the insolubles formed were removed by centrifuging (at 6,700 times gravity) at 65° F. for 15 minutes. This is referred to as "dehazing" and is disclosed and claimed in the Schroeder Patent 2,891,866. The process yield of soluble tea solids, defined as the weight of converted green tea solids divided by the weight of the original green tea solids (times 100), was 89.2%. The color of the extract was 360 as measured by the Klett method. This solution was then stripped of aroma as described in U.S. Patent 2,927,860 and concentrated to a solids content of 45%. A weight of maltodextrins equal to the weight of tea solids present was added to the concentrated extract. The stripped aroma was added back to the converted green tea concentrate containing the maltodextrins. Portions of this concentrate were then mixed at levels of 25, 35, and 50% with 75, 65 and 50%, respectively, of a similar concentrate prepared by conventional procedures from a black tea leaf. The concentrate mixes were vacuum drum dried. The resulting powders all had satisfactory solubility and clarity in cold hard water and color and flavor similar to a high quality beverage made from commercial black tea leaf. The color and clarity of the blended and unblended products are summarized in Table I.

TABLE I

| Tea products | Klett color | Clarity index |
|---|---|---|
| 100% converted green | 355 | 67 |
| 50% converted green and 50% commercial black | 300 | 18 |
| 35% converted green and 65% commercial black | 282 | 23 |
| 25% converted green and 75% commercial black | 282 | 7 |
| 100% commercial black | 264 | 3 |

Color was measured in a Klett Colorimeter by preparing 0.14% solution of instant tea in a buffer solution (0.944% NaH$_2$PO$_4$·H$_2$O; 0.858% Na$_2$HPO$_4$·7H$_2$O) at pH 6.4 and at 25° C. A 420 millimicron light filter was used. The instrument is calibrated against a dichromate standard.

Clarity was measured in a 0.7% solution of instant tea (tea solids basis) in synthetic hard water, at 13° C., using a Klett Colorimeter with a 660 millimicron light filter. The synthetic hard water contained 0.0179% CaCl$_2$·2H$_2$O, 0.015% MgSO$_4$ and 0.0062% NaHCO$_3$. After the measurement was made, the sample was centrifuged at 2000 times gravity and the absorbance was determined using the same filter. The difference between the two readings is the clarity index. In every case the clarity values of solutions made up with soft water are substantially lower (i.e., clearer) than those made with hard water.

EXAMPLE 2

The effect of varying the conversion pressure was investigated by the following procedure. An extract of green tea containing 5% dissolved tea solids was heated to 100° C. and a predetermined air pressure was applied to each of four different samples. The pressure and temperature were maintained for each sample for 15 minutes. The treated solutions were then adjusted in pH to 5.5 and were dehazed (with CaCl$_2$) as described in Example 1 and freeze-dried. The pressures maintained during each of the operations for the respective samples were 0, 200, 400, and 800 p.s.i. gauge. The yield data and pH after treatment for each of the tests are summarized in the following table.

TABLE II

| Pressure (p.s.i.g.) | pH after treatment | Dehazing loss (percent) | Process yield (percent) | Klett color | Product Taste | Aroma |
|---|---|---|---|---|---|---|
| 0 | 5.2 | 5.3 | 94.5 | 105 | Green | Green. |
| 200 | 4.5 | 14.4 | 86.0 | 138 | Somewhat green | Somewhat black tea-like. |
| 400 | 4.1 | 13.8 | 86.7 | 207 | Good black tea | Good black tea. |
| 800 | 4.1 | 6.5 | 93.5 | 264 | Fair black tea | Fair black tea. |

Color measurements were made by the Klett method on each of the products obtained by treatment at 200, 400 and 800 p.s.i.g. It will be observed that when other conditions are maintained constant, an increase in pressure results in an increase in the color development, indicating that the conversion of green tea is increased by increasing pressure. The loss during dehazing first increased and then decreased as pressure was increased, reflecting greater conversions to useful product. The aroma that developed during the 400 and 800 p.s.i.g. procedures was characteristic of black tea. The aroma that developed during the 400 p.s.i.g. procedure was judged to be the best. The procedure carried out at atmospheric pressure resulted in a product that was substantially unchanged in taste and color compared with the starting material.

EXAMPLE 3

The effect of varying the time of conversion was investigated in the following procedure. Green tea extract containing 5% soluble tea solids was heated to 100° C. and air pressure at 800 p.s.i.g. was applied. The temperature and pressure were maintained constant for various periods of time, respectively, for several different samples of the same green extract. The treated solutions were processed according to the procedure described in Example 1. The data concerning the time of treatment, yield and pH of material after treatment are summarized in the following table.

TABLE III

| Time (min.) | pH after treatment | Dehazing loss (percent) | Process yield (percent) | Klett color | Product Taste | Aroma |
|---|---|---|---|---|---|---|
| 0 | 5.3 | 5.6 | 94.5 | 105 | Green | Green. |
| 2 | 4.7 | 10.4 | 88.4 | 135 | Somewhat green | Somewhat black tea-like. |
| 7.5 | 4.1 | 9.7 | 89.6 | 187 | ---do--- | Black tea-like. |
| 15 | 4.1 | 6.5 | 93.5 | 264 | Good black tea | Good black tea. |
| 30 | 3.7 | 4.3 | 97.4 | 352 | Black tea-like, but somewhat harsh. | Black tea-like, but slightly pruny aroma. |

It will be observed that there was a marked effect of time of treatment on color developed, indicating that as the time of treatment is increased the conversion of green tea is markedly correspondingly increased, when other conditions are maintained the same. A slight conversion occurred after 2 minutes of treatment under the described conditions. As in Example 2, the dehazing loss first increased and then decreased, reflecting increased yield of useful product. The aroma developed in the products treated for periods of time ranging from 2 to 30 minutes possessed characteristics of black tea aroma. Treatment for 15 minutes under the described conditions had the best black tea aroma and taste. It will also be noted that as the color increased for the respective samples, the pH of the treated solutions correspondingly decreased. By comparing these data with those in Example 2, it appears that converted green teas of similar color and quality can be prepared at different pressures by varying the reaction time, that is, if it were desired to lower the pressure, a similar product could be obtained by increasing the time of treatment.

EXAMPLE 4

The effect of varying the temperature of conversion was investigated by the following procedure. Green tea solutions containing 5% dissolved tea solids were heated and maintained at various temperatures under air pressure of 800 p.s.i.g. for 15 minutes. The treated solutions were adjusted to pH 5.5, dehazed as described in Example 1 and freeze-dried. The temperature, yield and pH data are presented in the following table as well as the taste and aroma of the product.

TABLE IV

| Temp. (° C.) | pH after treatment | Dehazing loss (percent) | Process yield (percent) | Klett color | Product Taste | Product Aroma |
|---|---|---|---|---|---|---|
| 25 | 5.6 | 5.5 | 86.5 | 98 | Green | Green. |
| 50 | 5.2 | 10.0 | 88.2 | 116 | Green taste | Very slight black tea-like. |
| 100 | 4.1 | 6.5 | 93.5 | 264 | Good black tea | Good black tea. |

Increasing temperature results in an increase in color. At 25° C. and 50° C. the development of color and taste during the 15 minute conversion period was not substantial. However, above 50° C. there was a marked increase in color development indicating a marked increase in conversion of green tea. Higher yield and lower dehazing loss were also obtained.

In producing any product having particularly desired properties, the conditions of pressure, temperature and time of treatment are interdependent, and will also be affected by other conditions, such as the type of tea used, the concentration of the tea solids in the solution, etc., as shown subsequently. These conditions can, however, be appropriately selected and controlled by those skilled in the art to produce the desired product. Pressures above about 100 p.s.i. gauge are desirable in order to obtain satisfactory conversions within reasonable times. Temperatures above about 50° C. are also desirable to effect satisfactory conversions within reasonable times. Generally preferred pressures are in the range of about 200 to 800 p.s.i.g. and preferred temperatures are in the range of about 75° C. to about 125° C.

EXAMPLE 5

The effect of varying the concentration of dissolved green tea solids was investigated in the following procedure. Several solutions of green tea solids which varied in concentration from 5 to 30% were selected for evaluation. Each solution was heated to 100° C.±5° C. and an air pressure of 800 p.s.i.g. was applied for 15 minutes. The treated solutions were diluted to 5% solids. The pH was adjusted to 5.5 and they were dehazed as described in Example 1. The data on concentration, yields, pH and color are summarized in the following table:

TABLE V

| Concen. percent solids | pH after treatment | Klett color | Process yield (percent) |
|---|---|---|---|
| 5 | 4.1 | 264 | 93.5 |
| 15 | 4.3 | 162 | 85.3 |
| 30 | 4.5 | 124 | 79.8 |

All of the products possessed a good black tea aroma and taste. The product converted at 5% concentration was judged the best. The color development decreased markedly with increasing concentration of dissolved green tea solids. This is an indication that concentration is another factor to be considered in selecting a suitable combination of conditions, including pressure, time and temperature, to bring about the desired degree of conversion. Although the color development and yield obtained at 15% and 30% concentrations were not as high as those at 5% concentration, it will be understood that higher yields and color development may be realized at such higher concentrations by increasing the temperature, the time of treatment, and/or other variables discussed herein. There are obvious economic advantages to be expected in the use of such higher concentrations. Generally, preferred concentrations of tea solids in the initial material are in the range 2–30%.

EXAMPLE 6

The effect of varying the initial pH of the green tea solution (prior to conversion) was investigated by the following procedure. Green tea solutions containing various quantities of potassium hydroxide were prepared and heated to 100° C. in a pressure vessel equipped with an agitator. Air pressure was increased to 800 p.s.i.g. and temperature and pressure were maintained for 15 minutes. For purposes of comparison, an aliquot of the green tea solution was treated as follows: potassium hydroxide (5%) was added and nitrogen was sparged through the tea solution while it was being heated in the pressure vessel to 100° C.; the vessel was pressurized with nitrogen to 800 p.s.i.g. and temperature and pressure were maintained as above; after treatment the material required 0.24 gram IR 120 (H+) resin (50% H$_2$O) per gram of tea solids to reduce the pH to 5.5. The material treated with air was adjusted to the same pH of 5.5 with alkali as described in Example 1. All solutions were dehazed as described in Example 1. The data on the amount of KOH added, pH, color and yield are summarized in the following table.

TABLE VI

| Percent KOH added (initially) | pH initial | pH after treatment | Dehazing loss (percent) | Klett color | Process yield (percent) |
|---|---|---|---|---|---|
| 0 (nitrogen) | 5.5 | 5.3 | | 98 | 92.0 |
| 0 | 5.5 | 4.1 | 6.5 | 264 | 93.5 |
| 3.5 | 7.9 | 4.7 | 1.2 | 323 | 98.5 |
| 5.0 | 8.4 | 4.8 | 0.1 | 330 | 98.2 |
| 5.0 (nitrogen) | 8.2 | 7.8 | | Ca. 100 | 89.9 |

The amount of color developed in the product increases with increasing amounts of KOH added initially. The yields of the final products were satisfactory. This effect of alkali on color is particularly noticeable when the initial pH is above about 7.0.

The products obtained from the nitrogen-sparging procedure were green in taste and color. While the level of alkali is an important factor affecting the degree of conversion of green tea, elevated pH is not sufficient to carry out this change in the absence of oxygen even under conditions of pressure and elevated temperatures.

Thus, the concentration of oxygen in the gas used should also be considered. From the standpoint of economy air may be generally preferred, however gases containing more or less oxygen may be used. Higher oxygen concentrations will produce more rapid and/or complete reaction, other conditions being the same. Lower oxygen concentrations are adaptable, and may be preferred in certain situations, as where slower reactions are sought. Generally, however, oxygen concentrations above about 5% will be used in order to afford a sufficiently high reaction rate and short reaction time.

EXAMPLE 7

Another series of procedures was carried out to investigate the effect of varying the time, initial pH and pressure on the quality of the products obtained. The procedures were substantially the same as described in Example 1 (except as noted in Table VII). The starting material used was freeze-dried Japan Green Tea (Lipton blend) for all of the experiments except the one carried out for 12 minutes at 800 p.s.i.g. In the latter case, the starting material was freeze-dried extract solids from Japanese Green Tea siftings. The conditions and results are summarized in the following table.

TABLE VII

|  | 800 p.s.i.g. | | | 400 p.s.i.g. | | | 200 p.s.i.g. | | |
|---|---|---|---|---|---|---|---|---|---|
| Reaction time (min.) | 15 | 12 | 15 | 15 | 15 | 30 | 15 | 15 | 15 |
| Percent KOH added initially | | | | 3.5 | 5.0 | | | 3.5 | 5.0 |
| pH after treatment | 4.0 | 4.1 | 4.4 | 4.9 | 5.4 | 4.0 | 4.5 | 5.4 | 6.0 |
| Percent KOH added to readjust to pH 5.5 | 3.3 | 3.8 | 2.5 | 1.2 | None | 3.0 | 1.6 | None | (¹) |
| Yields, percent: | | | | | | | | | |
| Process yield | 93.2 | 92.7 | 86.9 | 97.5 | 101.2 | 90.4 | 86.0 | 92.9 | 93.4 |
| Klett color (420 mµ) | 276 | 266 | 200 | 310 | 355 | 234 | 146 | 210 | 240 |
| Clarity index | ²39 | ²83 | 16 | 24 | 19 | 15 | 9 | 6 | 7 |

¹ Adjusted with IR 120 (H⁺) resin.   ² Particulate matter in liquid concentration.

The process yields reported in Table VII were satisfactory. The color of the dried products could be controlled by adjusting processing conditions in a manner consistent with previous examples. The preferred color values are between 220 and 250. The decrease in pH of the initially alkalinized green tea solutions reacted at 200–400 p.s.i.g. is of interest. The pH of the tea solutions after high-pressure treatment (4.9–6.0) were similar to the pH of black tea extracts. Thus, the conversion process can be simplified by eliminating the need to adjust the pH after the conversion has been carried out.

EXAMPLE 8

The use of the high pressure techniques described herein for the treatment of the green leaf itself in the presence of water was investigated in the following procedure. Fired green tea leaf (Japanese Green Tea Siftings) was combined with distilled water in a ratio of 9:1 water to leaf. The leaf-water mixture was macerated to a fine mash in a Waring Blendor, divided into two equal portions and alkali added to one portion. The amount of alkali added was 5.0% based on the amount of extractable solids (30%) present in the original dry leaf. The agitated pressure vessel was charged with 1 kilogram portions of one of the above leaf-water mixtures and the material was treated at 100° C. and air pressure of 800 p.s.i.g. and other conditions stated in Table VIII. After treatment the mixtures were centrifuged in an International Basket Centrifuge, the supernatant solution was collected and the percent of extractable solids was determined. The extract was adjusted in pH to 5.5, dehazed and freeze-dried. The results and measurements made on the product are also presented in Table VIII.

TABLE VIII

|  | Macerated leaf | Macerated leaf plus 5% alkali based on tea solids |
|---|---|---|
| Reaction time, min | 30 | 30 |
| pH of extract after treatment | 4.2 | 4.6 |
| Percent KOH added to readjusted pH to 5.5 | 3.2 | 2.4 |
| Klett color (420 mµ) | 261 | 286 |
| Extractable solids (starting leaf basis) | 31.4 | ¹33.5 |

¹ Includes KOH added initially.

These data show that simultaneous high pressure extraction and conversion directly carried out on the green leaf result in a normal extraction efficiency. The color developed and other characteristics were similar to such characteristics of products obtained from the conversion procedures described in previous examples, which were carried out on the green tea extract. Such a combined treatment of leaf and extract therefore offers reduction of the processing cost. It is also apparent that the conversion of green to black tea leaf may be carried out by adding a small amount of water to the green leaf and converting to black tea leaf under the conditions of high pressure, etc. described above. The converted leaf, after drying, is suitable as tea for use in tea bags or as loose tea.

The coordinate effect of pressure, temperature and time of reaction in producing a desired degree of conversion of green tea has been previously noted. From the additional examples it will be appreciated that pH, concentration of oxygen and concentration of tea solids also have a bearing on the conditions which are desirable or necessary to produce a converted green tea having the desired properties. Thus, higher initial pH's generally produce greater degree of black tea color. Higher concentrations of oxygen produce more rapid conversion, or conversion at lower temperature or in a shorter time. When the process is carried out using higher concentrations of tea solids, then longer times of conversion, higher temperatures, greater pressures (or possibly all three conditions) or other conditions discussed herein may be required to effect a desired degree of conversion.

The source of the green tea used as starting material may also have a bearing. One green tea may require a somewhat different combination of pressure, temperature and time, etc. than another green tea. It is also possible to blend teas from different sources in order to promote uniformity of the product obtained. In the following claims, it will be understood that when green tea is referred to it is intended to include both fresh green leaf and manufactured green tea.

I claim:

1. The process of converting green tea to black tea which comprises heating an aqueous solution containing at least about 2% green tea solids at a temperature above about 50° C. and under a pressure of at least about 100 p.s.i. gauge in the presence of a gas containing at least about 5% of oxygen, and allowing said green tea solution to react with said oxygen for at least about 7.5 minutes to oxidize said green tea solids.

2. The process of converting constituents of green tea to a black tea which comprises heating said constituents in the presence of water and a gas containing at least about 5% oxygen at a temperature above about 50° C. and under a pressure of at least about 100 p.s.i. gauge, and allowing said constituents to react with said oxygen for at least about 7.5 minutes to convert said constituents, the weight of said constituents being at least about 2% of the weight of said water.

3. The process of claim 2 in which the pressure is approximately 200 to 800 p.s.i.

4. The process of claim 3 in which the temperature is about 75° C. to 125° C.

5. The process of claim 2 in which the oxygen is supplied by air.

6. The process of claim 2 in which the initial pH before conversion is raised to above about 7.0.

7. The process of claim 1 in which the concentration of tea solids in the initial solution is about 2–30%.

8. The process of claim 2 in which the process is carried out in the presence of the tea leaves, and the leaves are thereafter dried.

9. The process of claim 1 in which the converted green tea is dried to produce an instant tea.

10. The process of claim 8 in which at least the major portion of said water is that naturally occurring in the green leaf.

11. The process of converting constituents of partially fermented tea to a black tea which comprises heating said constituents in the presence of water and a gas containing at least about 5% oxygen at a temperature above about 50° C. and under a pressure of at least about 100 p.s.i. gauge, and allowing said constituents to react with said oxygen for at least about 7.5 minutes to convert said constituents, the weight of said constituents being at least about 2% of the weight of said water.

12. The process of converting constituents of green tea to a product equivalent to partially fermented tea, which comprises heating said constituents in the presence of water and oxygen at a temperature above about 50° C. and under a pressure of at least about 100 p.s.i. gauge, and allowing said constituents to react with said oxygen for at least about 7.5 minutes to convert said constituents, the weight of said constituents being at least about 2% of the weight of said water.

References Cited

UNITED STATES PATENTS

| | | | |
|---|---|---|---|
| 2,278,474 | 4/1942 | Musher | 99—76 |
| 2,863,775 | 12/1958 | Perech | 99—76 X |
| 3,151,985 | 10/1964 | Fobes | 99—76 X |

MAURICE W. GREENSTEIN, *Primary Examiner.*

UNITED STATES PATENT OFFICE
CERTIFICATE OF CORRECTION

Patent No. 3,445,236                                                    May 20, 1969

Martin Gurkin

It is certified that error appears in the above identified patent and that said Letters Patent are hereby corrected as shown below:

Column 1, line 16, "a black tea which comprises heating said constituents in the" should read -- a pressure of at least 100 p.s.i. gauge, and allowing said --. Column 2, line 20, "fermentation" should read -- tea fermentations --. Column 5, line 4, "smiliar" should read -- similar --. Columns 7 and 8, TABLE VII, in the horizontal line between lines 22 and 23 under the headings 800 p.s.i.g., 400 p.s.i.g. and 200 p.s.i.g., break said horizontal line to the left of the first column of figures and between the 2nd and 3rd column of figures, and again between the 6th and 7th column of figures so as to indicate that the first 2 columns of figures come under the heading 800 p.s.i.g., the 3rd, 4th, 5th and 6th columns of figures come under the heading 400 p.s.i.g. and the 7th, 8th and 9th columns of figures come under the heading 200 p.s.i.g. Column 7, line 71, "readjusted" should read -- readjust --.

Signed and sealed this 28th day of April 1970.

(SEAL)
Attest:

EDWARD M. FLETCHER, JR.                         WILLIAM E. SCHUYLER, JR.
Attesting Officer                                Commissioner of Patents